UNITED STATES PATENT OFFICE 2,360,517

CEMENT COMPOSITION AND METHOD OF MAKING THE SAME

Edward W. Scripture, Jr., Shaker Heights, Ohio

No Drawing. Application August 14, 1941,
Serial No. 406,904

5 Claims. (Cl. 106—90)

This application is a continuation-in-part of my prior application Serial No. 299,696, filed October 16, 1939, now Patent No. 2,264,336, and the invention relates to a process and composition for grinding cements. It particularly relates to a method of grinding cements wherein the speed of grinding may be increased with existing equipment.

Hydraulic cements are manufactured by mixing together in a finely divided state, in suitable proportions, either by a wet process or a dry process, suitable raw materials, usually of a calcareous and a silicious nature, to produce after the manufacturing operation chemical compounds having hydraulic and cementitious properties in the desired proportions. The mixed raw materials are heated together in a kiln, in modern practice usually a rotary kiln, and burned at a temperature which causes sintering, or in some cases they may be burned to actual fusion. After burning the resultant product, usually called "clinker," is allowed to cool. In this stage of manufacture the cementitious compounds have been formed but exist in a physical state, that of relatively large pieces with very low surface area, in which they cannot be used to make mortar or concrete mixes. This cement clinker is then reduced by grinding usually in a ball mill of either the intermittent or continuous type, to a relatively fine state of subdivision having a relatively large surface area. During this stage, calcium sulphate in one form or another is usually added to the cement to prevent too rapid set.

The hydraulic properties of the cement depend on its chemical composition and on the burning operation, but also to a considerable extent on the grinding and the degree of fineness to which it has been reduced. For example, the plastic properties and the rate at which the cement hydrates are markedly affected by the surface area, that is, the degree of grinding.

The grinding of cement clinker requires the use of considerable equipment and consumes a substantial period of time. In order to operate the equipment, power in one form or another is required. The grinding operation, therefore, adds substantially to the cost of manufacture of cement and it will be obvious that the finer the grinding the greater will be this cost.

It has heretofore been known that certain materials when added to cement clinker in the mill will facilitate grinding and will increase the efficiency of this operation. In order to be useful, such materials must not have an adverse effect on the plastic or hydraulic properties of the cement, as by retarding or preventing hydration. It is preferable that such materials, which may be termed "grinding aids," shall improve the properties of the cement and of the mortar or concrete in which they are used with respect to strength, rate of hardening, plasticity, durability, or other properties.

It is an object of this invention to provide a method of producing finely ground cement, wherein the cost of grinding the cement clinker is reduced.

It is a further object of this invention to provide a method for grinding cements, wherein the time required to reduce cement clinker to a given surface area is reduced.

It is a further object of this invention to provide a method wherein the finer grinding of cement clinker and the production of a cement of greater surface area are facilitated.

It is a further object of this invention to provide a ground cement clinker which shall have improved plastic and hydraulic properties.

In accordance with the present invention, these objects are accomplished by incorporating with the cement clinker in the grinding mill a relatively small percentage, based on the weight of the cement of a compound having the general formula:

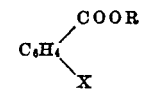

where R is a member of the group consisting of metals, ammonium, organic radicals and hydrogen, and X is a member of the group consisting of functional groups, derivatives thereof, and non-functional groups. The preferred compounds are solids at normal temperatures. Among the compounds of the above formula, the salicylates, derivatives thereof and compounds containing the salicylate group appear to be particularly effective.

Examples of the salicylates are—

(a) The metal salicylates, including salicylates of the alkali metals, the alkaline earth metals, mercury, bismuth, zinc and others.

Examples of other compounds which contain the salicylate grouping and which are effective are:

(b) Salicyclic acid, acetylsalicylic acid, sulpho-salicylic acid and caffeine-salicylic acid.

Other very effective compounds are the substituted benzoic acids and derivatives thereof. Examples of these are:

(c) Hydroxy benzoic acids, nitro-benzoic acids, amino benzoic acids, methyl amino benzoic acids, such as methyl salicylate and benzene dicarboxylic acids, such as phthalic acid, etc.

It may be noted that the substituted groups may be in positions ortho, meta or para to the carbonyl. Other groups may also be substituted in the benzene nucleus without harming the effectiveness of the compounds. Thus sulphosalicylic acid, which is a sulphonated salicylic acid, is a very effective material.

It has been observed that in the grinding of cement clinker the balls, in a ball mill, and the walls of the mill tend to become coated with the more or less finely ground cement. This formation on the grinding surfaces apparently exerts a cushioning effect, such that the rate of grinding is thereby greatly diminished.

I have found that when small amounts of these chemical compounds are added to cement clinker in a ball mill, the formation of a cushion on the grinding surfaces appears to be reduced and the efficiency of the grinding operation is increased. In this manner the time required, and consequently the power input, to grind to a particular degree of fineness or surface area is reduced, or for a given time and power input the degree of fineness or surface area is increased.

The saving in grinding time depends to a large extent both on the quantity of the above described compounds, which are present in cement, and on the degree of fineness desired in the cement. With an increase of the salicyclic acid or equivalent material from effective amounts, such as .005% on the weight of the cement, there is an increased efficiency in grinding until about .05% or .1% on the weight of the cement is present. Although as much as .3% to .5% of salicyclic acid or equivalent compound of the above general formula may be incorporated with the cement clinker, appreciable further improvement in results is not obtained and with more than .3% the degree of improvement in the cement is usually less. When the cement is ground to a greater surface area, the reduction in the time required to reach this surface area by means of the present invention is substantially increased.

The following examples illustrate the present invention:

*Example 1*

I have performed experiments in grinding cement clinker with and without salicyclic acid, grinding to equal surface areas. .05% salicyclic acid was added to one sample of cement clinker and ground to a surface area of approximately 1660 sq.cm./gram. To another identical sample of cement clinker no addition was made and grinding was carried out to obtain an approximately equal surface area. The surface areas of the resulting cements were determined by means of a Klein turbidimeter. The customary proportion of gypsum was used in both cases. In the case of the cement clinker ground without salicyclic acid, 120 minutes were required to reach the desired surface area, whereas in the case of the cement clinker ground with the salicyclic acid, only 90 minutes were required.

*Example 2*

I have performed similar experiments in grinding cement clinker with and without salicyclic acid, but grinding to a higher surface area, namely, approximately 2100 sq.cm./gram. In the case of the clinker ground without salicyclic acid 243 minutes were required to attain this surface area, whereas for the clinker ground with salicyclic acid, only 144 minutes were required.

For convenience the results of the foregoing examples are listed in the following tables:

|   |   | Surface area, sq. cm./gram | Grinding time min. |
|---|---|---|---|
| 1 | Cement ground without salicyclic acid | 1,660 | 120 |
| 2 | Cement ground with salicyclic acid | 1,665 | 90 |
| 3 | Cement ground without salicyclic acid | 2,110 | 243 |
| 4 | Cement ground with salicyclic acid | 2,110 | 144 |

It will be seen that in the first comparison (cements 1 and 2), with grinding to a relatively low surface area, a reduction in grinding time of approximately 25% was secured with the salicyclic acid; in the second comparison (cements 3 and 4) with grinding to a fairly high surface area, a reduction of about 40% was effected.

In addition to decreasing the time required for grinding the cement clinker, the compounds of the above general formula also substantially improve the properties including the compressive strength, of the cement. The following example illustrates the improvement in the early and late compressive strengths of a suitable mix:

*Example 3*

Tests were made of the cement ground with salicyclic acid to determine whether it affected the cement in an adverse or beneficial manner. Test cylinders were made from a concrete mix comprising cement, aggregates and water in the proportions:

```
                                                Pounds
Cement _____   447
Sand _____  1340
Stone ¾" _____  1985
```

In one mix the cement ground without salicylic acid was used and in the other that ground with salicyclic acid was used. Water was added to both mixes to bring them to approximately equal consistency. In both cases, eight gallons of water per sack of cement were required to produce a slump of two and one-half inches in the first case and three inches in the second. Test specimens, 6" x 12" in size, were prepared from both mixes, cured and broken in a compression testing machine according to standard procedure at various ages. The results of these strength tests were as follows:

|   | Compressive strength, lbs./sq. in. | | | |
|---|---|---|---|---|
|   | 1 day | 3 days | 7 days | 28 days |
| Cement ground without salicylic acid | 555 | 1,775 | 2,815 | 3,270 |
| Cement ground with salicylic acid | 650 | 2,530 | 3,580 | 4,300 |

It will be seen that far from having a deleterious effect, as do some grinding aids, the grinding with salicyclic acid has improved the properties of cement mixes.

*Example 4*

Tests were made in the manner previously described in Example 3 with concrete mixes, using the four cements of Example 2 with results as follows:

|   |   | Surface area, sq. cm./ gram | Water, gals./ sack | Slump, in. | Compressive strength, lbs./sq. in. | | |
|---|---|---|---|---|---|---|---|
|   |   |   |   |   | 3 days | 7 days | 28 days |
| 1 | Cement [1] | 1,660 | 7.45 | 2¾ | 2,020 | 2,775 | 3,810 |
| 2 | ......do.[2] | 1,665 | 7.00 | 2½ | 2,790 | 3,840 | 4,950 |
| 3 | ......do.[1] | 2,110 | 7.60 | 3 | 2,375 | 3,110 | 3,985 |
| 4 | ......do.[2] | 2,100 | 7.45 | 2½ | 2,970 | 3,440 | 4,760 |

[1] Cement ground without salicylic acid.
[2] Cement ground with salicylic acid.

It will be seen from the above that an outstanding improvement in the strength of the cement is obtained by the practice of the present invention. By grinding one or more of the above described compounds with the cement, they are more uniformly dispersed in the cement and are forced into intimate contact and even into the pores of the individual particles of cement so that in most instances, superior results are obtained.

While I have chosen to illustrate the present invention by compositions containing salicylic acid and salicylates which are very effective, it is understood that similar effects in increasing grinding efficiency are secured with the addition of small amounts of compounds having a constitution similar to that of salicylic acid, such as zinc salicylates as well as other compounds containing the salicylate groups or included by the above general formula. The above designated compounds may be substituted for salicylic acid in the above examples with substantially equivalent results.

It will be apparent that the compound which facilitates grinding, such as salicylic acid or a compound of similar constitution, may be added to the cement clinker as a dry powder or in solution, or in another physical form. It will also be apparent that more or less than the usual amount of gypsum or other form of calcium sulphate may be added, depending on the desired characteristics of the cement, and that other substances may be added to the cement at the same time or subsequently.

What I claim is:

1. In a process of grinding cement clinker, the step which comprises grinding the cement clinker in the presence of a small amount of a member of the group consisting of substituted benzoic acids, salts and esters thereof.

2. In a process of grinding cement the step which comprises adding to the cement clinker a small amount of a compound containing the salicylate group.

3. In a process of grinding cement the step which comprises adding to the cement clinker a small amount of a salicylate.

4. In a process of grinding cement the step which comprises adding to the cement clinker a small amount of salicylic acid.

5. In a process of grinding cement clinker, the step which comprises grinding the cement clinker in the presence of a small amount of a member of the group consisting of mono-substituted benzoic acids, salts and esters thereof.

EDWARD W. SCRIPTURE, Jr.